(12) United States Patent
Baisley

(10) Patent No.: US 6,684,386 B1
(45) Date of Patent: *Jan. 27, 2004

(54) METHOD FOR CONVERTING A UML RENDERING OF AN RSM-BASED METAMODEL TO A UML RENDERING OF MOF-BASED METAMODEL

(75) Inventor: Donald Edward Baisley, Laguna Hills, CA (US)

(73) Assignee: Unisys Corporation, Blue Bell, PA (US)

( * ) Notice: Subject to any disclaimer, the term of this patent is extended or adjusted under 35 U.S.C. 154(b) by 603 days.

This patent is subject to a terminal disclaimer.

(21) Appl. No.: 09/592,747

(22) Filed: Jun. 13, 2000

(51) Int. Cl.[7] ................................................ G06F 9/44
(52) U.S. Cl. ........................ 717/114; 717/100; 717/138
(58) Field of Search ........................... 345/853; 717/100, 717/114, 138, 103; 715/513; 709/315, 316

(56) References Cited

U.S. PATENT DOCUMENTS

| | | | |
|---|---|---|---|
| 6,199,195 B1 * | 3/2001 | Goodwin et al. | 717/104 |
| 6,289,501 B1 * | 9/2001 | Mutschler, III | 717/114 |
| 6,292,932 B1 * | 9/2001 | Baisley et al. | 717/114 |
| 6,343,265 B1 * | 1/2002 | Glebov et al. | 703/25 |
| 6,381,743 B1 * | 4/2002 | Mutschler, III | 717/104 |

OTHER PUBLICATIONS

Iyengar, Sridhar, "A Universal Repository Architecture unsing the OMG UML and MOF", 1998, EDOC '98. Proceedings. Second International, pp. 35–44.*
Atkinson, Colin, "Meta–Modeling for Distributed Object Environments", 1997, EDOC '97 Proceedings. pp. 90–101.*
Object Management Group, "OMG UML Specification", Jun. 1999, OMG, v1.3, p.B–17.*

* cited by examiner

Primary Examiner—Kakali Chaki
Assistant Examiner—Matthew Gubiotti
(74) Attorney, Agent, or Firm—Phuong-Quan Hoang; Mark T. Starr; Lise A. Rode (57) ABSTRACT

A computer-implemented method for converting a UML rendering of an RSM-based metamodel to a UML rendering of a MOF-based metamodel. The method includes the steps of removing inheritance from classes defined within a Repository Services Model ("RSM") and removing each explicit "construct" operation from each class in the RSM-based metamodel Next, each use in the RSM-based metamodel of an RSM type is changed to use a non-RSM type. After this, each element of the RSM-based metamodel is converted to a corresponding MOF-based element and a determination is made as to whether or not the RSM naming service is used in the RSM-based metamodel, and if so "name" attributes are added that would have been inherited from the RSM classes. A <<metamodel>> stereotype is added to the UML rendering of the MOF-based metamodel; and the MOF properties are set on the UML rendering.

20 Claims, 8 Drawing Sheets

METHOD FOR CONVERTING A UML RENDERING OF AN RSM-BASED METAMODEL TO A UML RENDERING OF MOF-BASED METAMODEL

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of object-oriented programming and in particular to a method for converting metamodels residing in the same or different repositories.

BACKGROUND OF THE INVENTION

Repositories provide a central place for recording metadata and enable one to store, manage, share and reuse information about data (i.e., metadata) that an enterprise uses. A repository can store definitional, management and operational information. Tools can be integrated with the repository to support information sharing and metadata reuse, and tool and technology models may be developed to manipulate the tool information in the repository. However, the transferring of data within models from tool to tool or from a tool to the repository has been a cumbersome and unyielding task for a long time.

A repository contains groups of metadata called models. A special kind of model, called a metamodel, describes the contents of other models. Metamodels typically contain classes, associations or references, and datatypes.

There are different kinds of metamodels supported by different kinds of repositories. One important way of defining metamodels is provided by the Repository Services Model (RSM). The RSM has been in use for a long time and has been used to define countless metamodels. A newer means of defining metamodels is provided by the Metaobject Facility (MOF). The MOF is standardized and is supported by many new repositories.

Metamodels defined for both RSM and MOF are designed using UML (Unified Modeling Language). But RSM and MOF are substantially different. There is a need to convert metamodels that have been based on RSM to work with MOF. In the past, conversion between RSM-based metamodels and MOF-based metamodels has been ad hoc and manual. There is a need for a method to automate the process of converting metamodels between RSM and MOF.

Further, RSM's versioning service requires multiplicities on compositions to be invalid for MOF-based metamodels. This incompatibility creates a need for automating the transition of multiplicity constraints in a way that preserves the intent of metamodel designers.

Also, directly mapping an RSM-based metamodel to a MOF-based metamodel apart from UML looses diagrammatic design details. It is important to have a method of conversion that works in the context of UML so as to preserve UML diagrams.

SUMMARY OF THE INVENTION

It is an object of the present invention to provide an automatic method for converting a UML rendering of an RSM-based metamodel to a UML rendering of a MOF-based metamodel.

Another object of the present invention is to provide a method that maps RSM-based metamodel to MOF-based metamodels following a consistent pattern.

Another object of the present invention is to provide a method that automatically detects and resolves composition multiplicity problems caused by RSM versioning.

And yet another object of the present invention is to provide a method that preserves UML diagrams of RSM-based metamodels when converting to MOF-based metamodels.

These and other objects, which will become apparent as the invention is described in detail below, are provided by a computer-implemented method for converting a UML rendering of an RSM-based metamodel to a UML rendering of a MOF-based metamodel. The method includes the steps of removing inheritance from classes defined within a Repository Services Model ("RSM") and removing each explicit "construct" operation from each class in the RSM-based metamodel Next, each use in the RSM-based metamodel of an RSM type is changed to use a non-RSM type. After this, each element of the RSM-based metamodel is converted to a corresponding MOF-based element and a determination is made as to whether or not the RSM naming service is used in the RSM-based metamodel, and if so "name" attributes are added that would have been inherited from the RSM classes. A <<metamodel>> stereotype is added to the UML rendering of the MOF-based metamodel; and the MOF properties are set on the UML rendering.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

The prefix "meta" as used herein shall describe a relationship. For example, "meta-data" describes data. In a similar fashion, a meta-object is an object that represents "meta-data"; and, "meta-model" means a model that defines an abstract language for expressing other models. A "meta-meta-model" means a model that defines an abstract language for expressing meta-models. The relationship between a meta-meta-model and a meta-model is analogous to the relationship between a meta-model and a model. The term model is generally used herein to denote a description of something in the real world. The concept of a model is highly fluid, and depends upon one's point of view. For example, where one is building an entire system, a model may include all of the metadata for the system. On the other hand, others are only concerned with certain components (e.g. programs A and B) or certain kinds of detail (e.g. wiring diagrams) of the system.

Repository Services Model ("RSM") is the primary model for the Universal Repository (UREP) available from the assignee hereof. It is an extensible object model contained in every repository instance. This model defines the functionality that is provided through the repository services of the UREP. Types are the main component of the RSM. Each type represents a particular class of objects. The type defines two kinds of features for the objects it represents: Property, which is a value that an object can take or the relationship of an object to other objects; and, Operation, which is a service that can be requested from an object, e.g., "get" or "set".

The Metaobject Facility (MOF) is a newer alternative to RSM for defining metamodels. The MOF is standardized by the Object Management Group (OMG).

The Unified Modeling Language, or "UML", provides the well-known modeling language supported by an ever-growing set of tools. Naturally, UML may be used to model metamodels based on either RSM or MOF.

Figure 1:
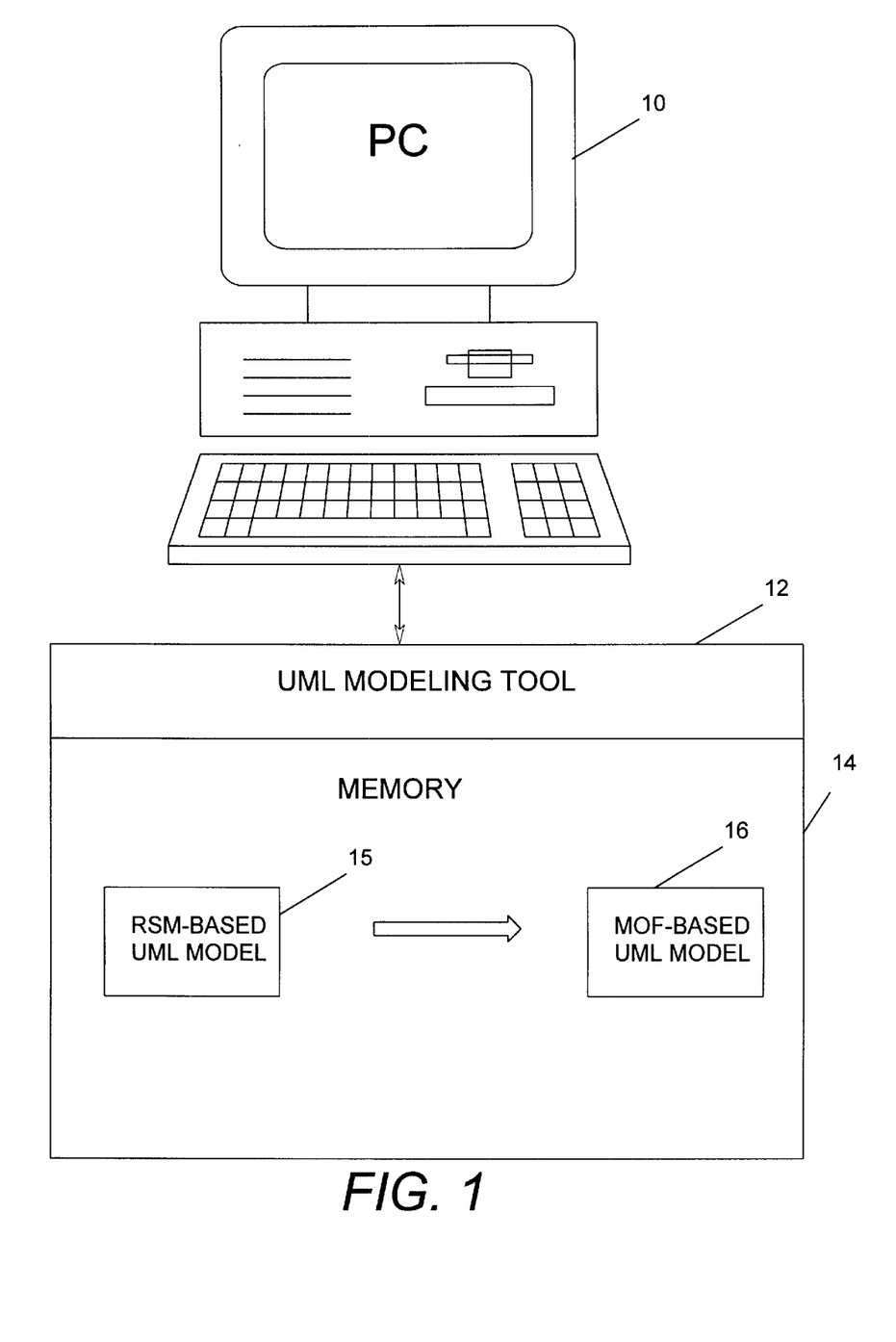
FIG. 1 is a block diagram of a computer system which may employ the method of the present invention.

Referring now to FIG. 1, a block diagram of a computer system that may employ the present invention is shown. A computer, such as a PC 10, which is capable of executing such programs as a UML modeling tool 12, includes a memory 14. The memory 14 has stored therein an RSM-based UML model 15 which is converted to a MOF-based UML model 16.

Figure 2:
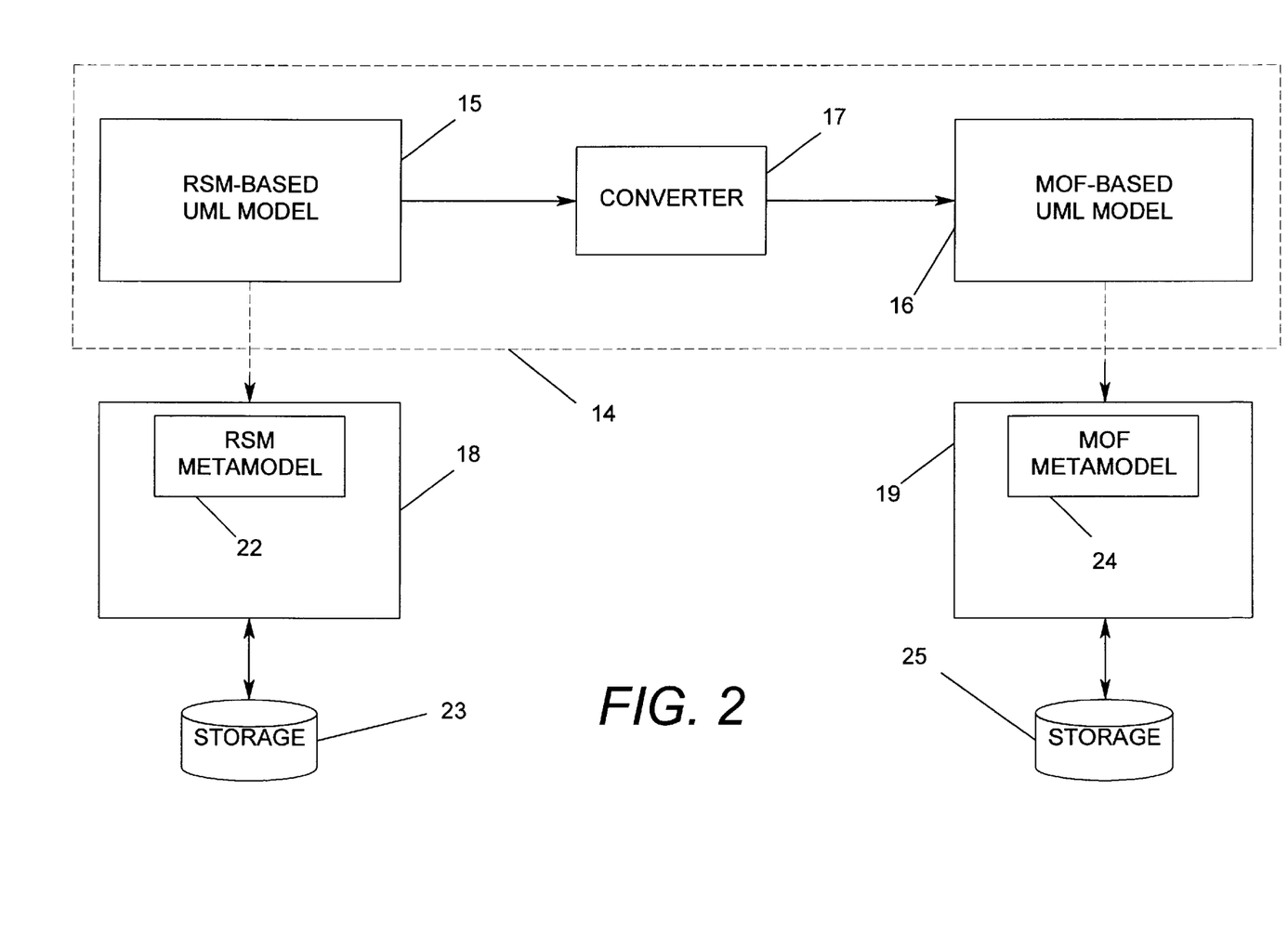
FIG. 2 is an overall block diagram illustrating operation of the method of the present invention.

Referring now to FIG. 2, a block diagram illustrates the overall operation of the method of the present invention. Again, the RSM-based UML model 15 and the MOF-based UML model 16 are shown within the memory 14 (illustrated by dashed lines). However, a converter 17, which includes the present invention, is now disposed between the model 15 and the model 16. The metamodel 15 is used to define an RSM Repository 18 designed using UML. The present invention converts (by means of converter 17) the UML design so that it can be deployed in a MOF-based repository 19. The RSM Repository 18 is coupled in a conventional manner to a storage device 23 and the MOF Repository 19, defined by a MOF Metamodel 24 is coupled to a storage device 25.

In the disclosed embodiment, the repository program 18 is a specialized, extensible object-oriented database application that adds value to a database system, which allows customization of a particular domain (such as application development), supports the RSM, and may comprise e.g., UREP.

The repository program 18 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U. S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; U.S. Pat. No. 6,018,627, for TOOL-INDEPENDENT APPLICATION DEVELOPMENT; and, U.S. Pat. No. 6,038,393, for EXCHANGING INFORMATION BETWEEN DIFFERENT OBJECT MODELS AND UML; each of which are hereby incorporated by reference as if set forth in full herein.

In the disclosed embodiment, the repository program 19 is similar to the repository program 18 in that it is a specialized, extensible object-oriented database application that adds value to a database system, which allows customization of a particular domain (such as application development), but the models defined therein use MOF-based metamodels.

Figure 3:
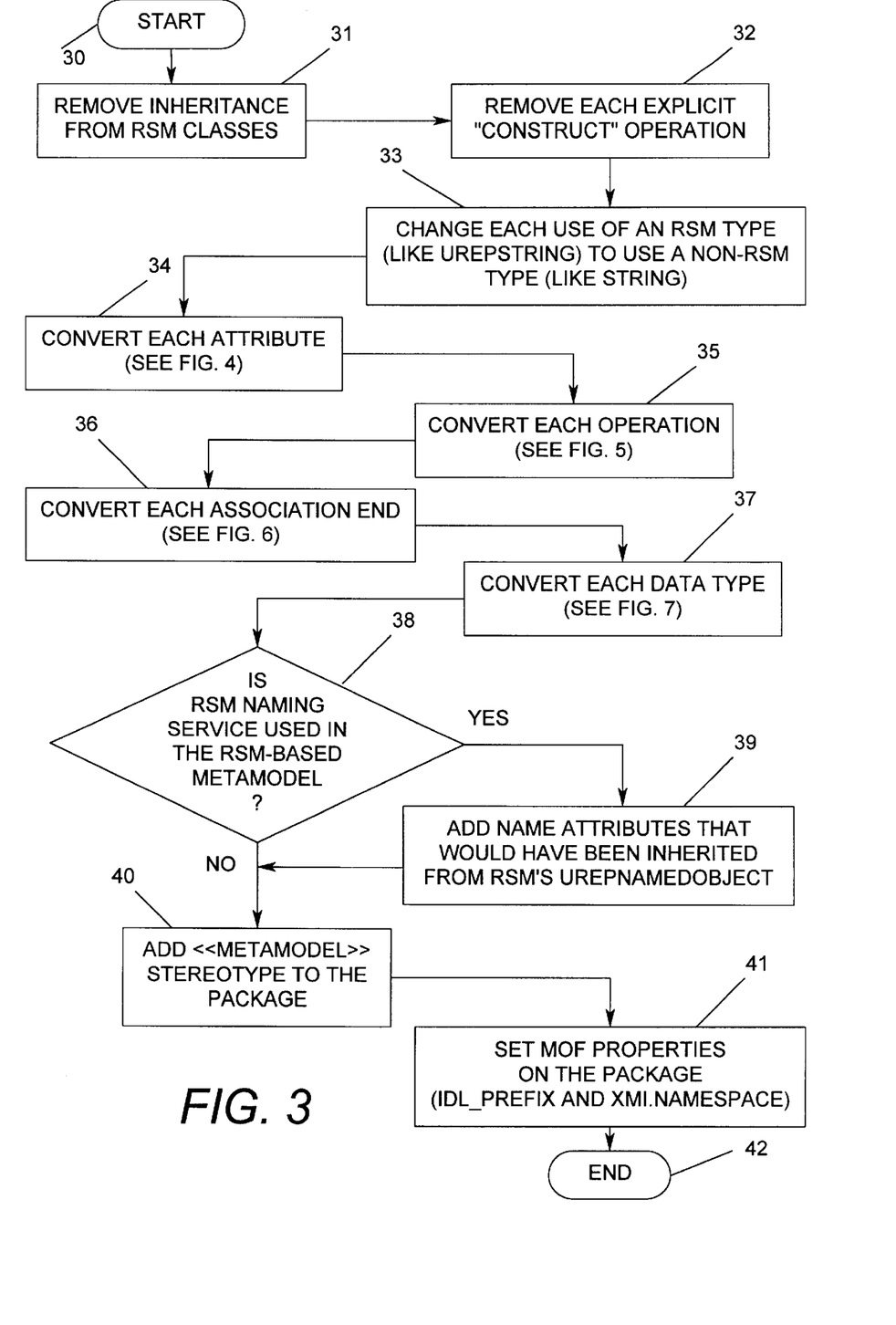
FIG. 3 is a flow chart of the process for converting a metamodel.
Figure 4:
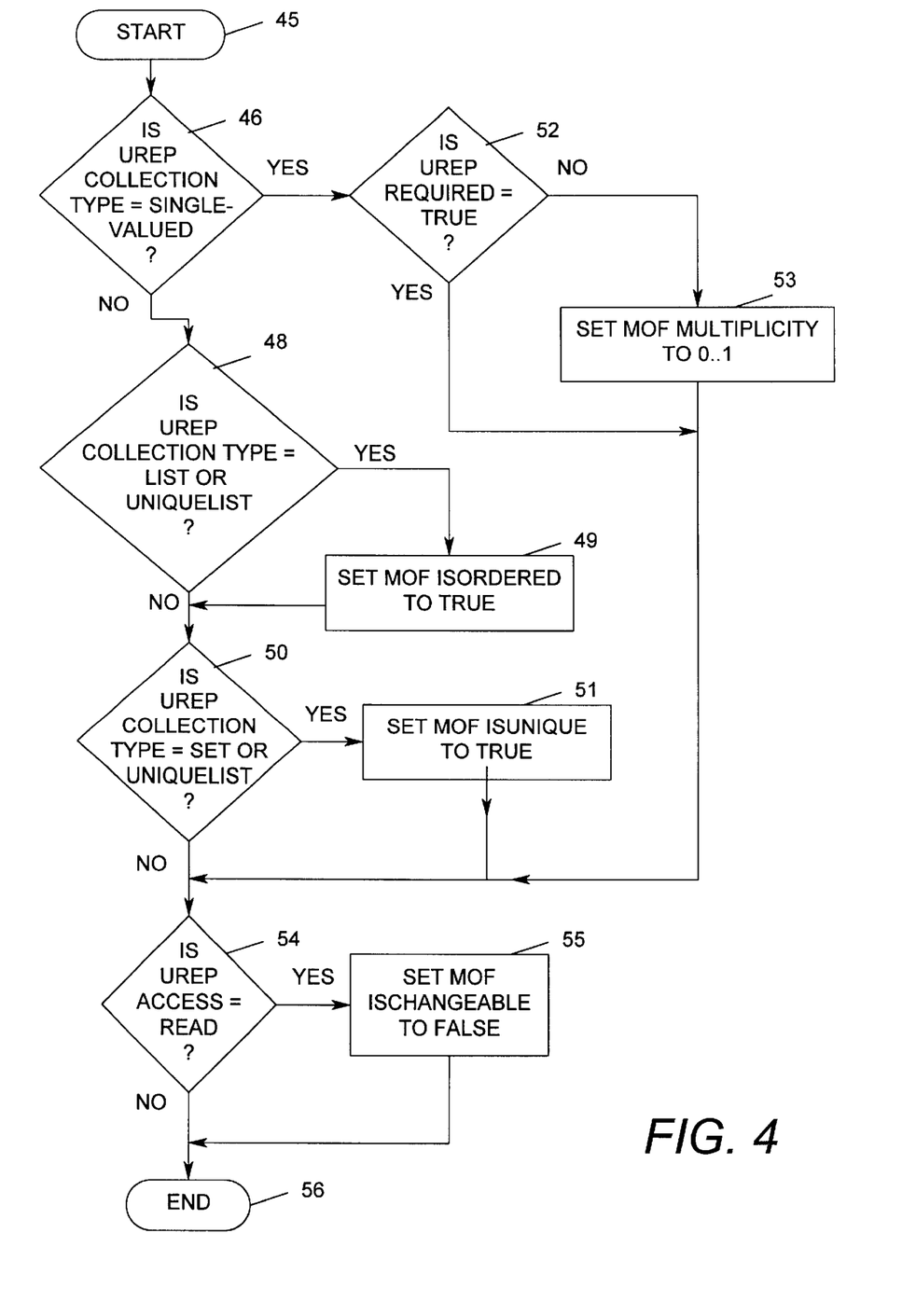
FIG. 4 is a flow chart of the process for converting an Attribute.
Figure 6:
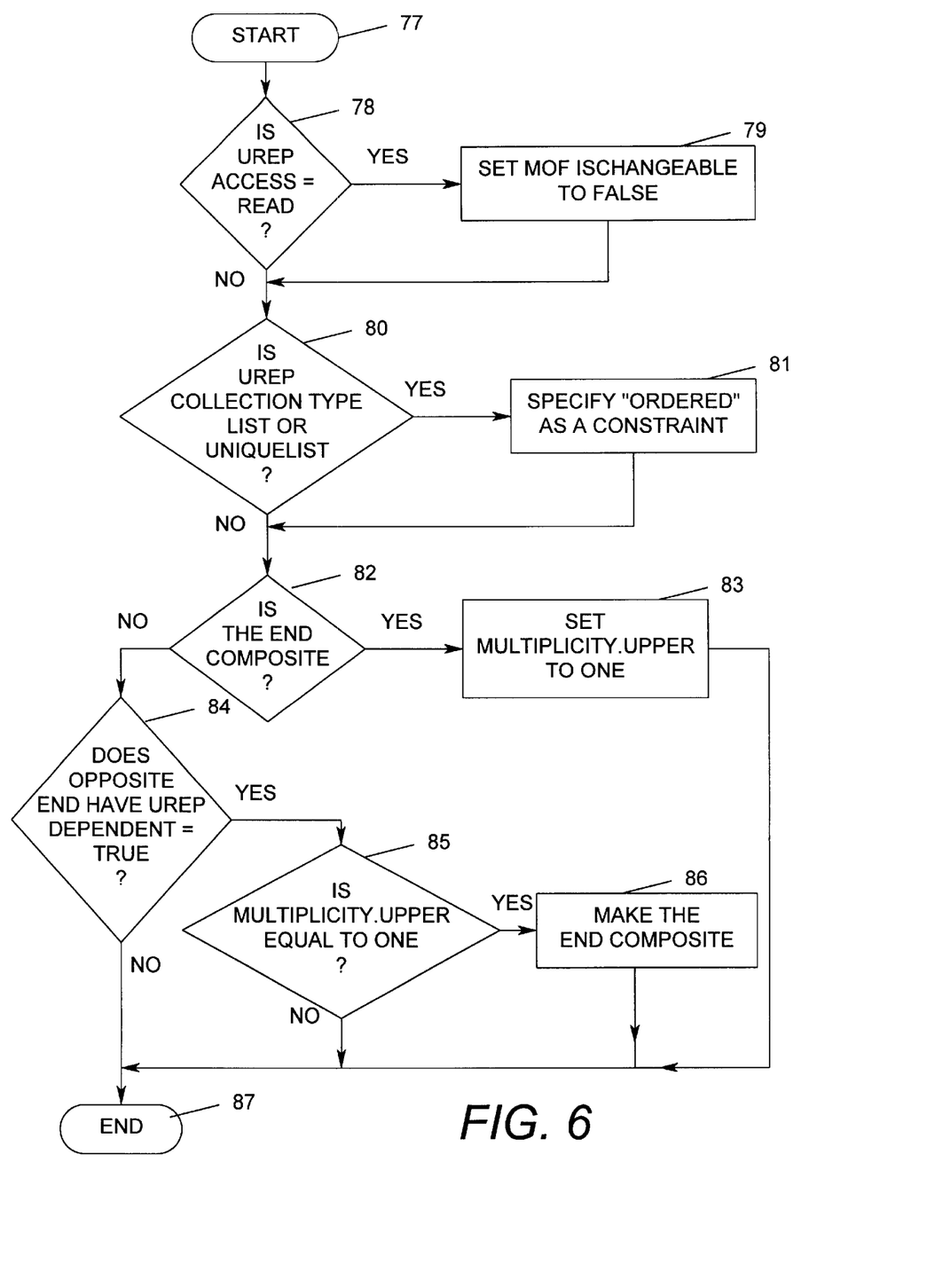
FIG. 6 is a flow chart of the process for converting an AssociationEnd.
Figure 7:
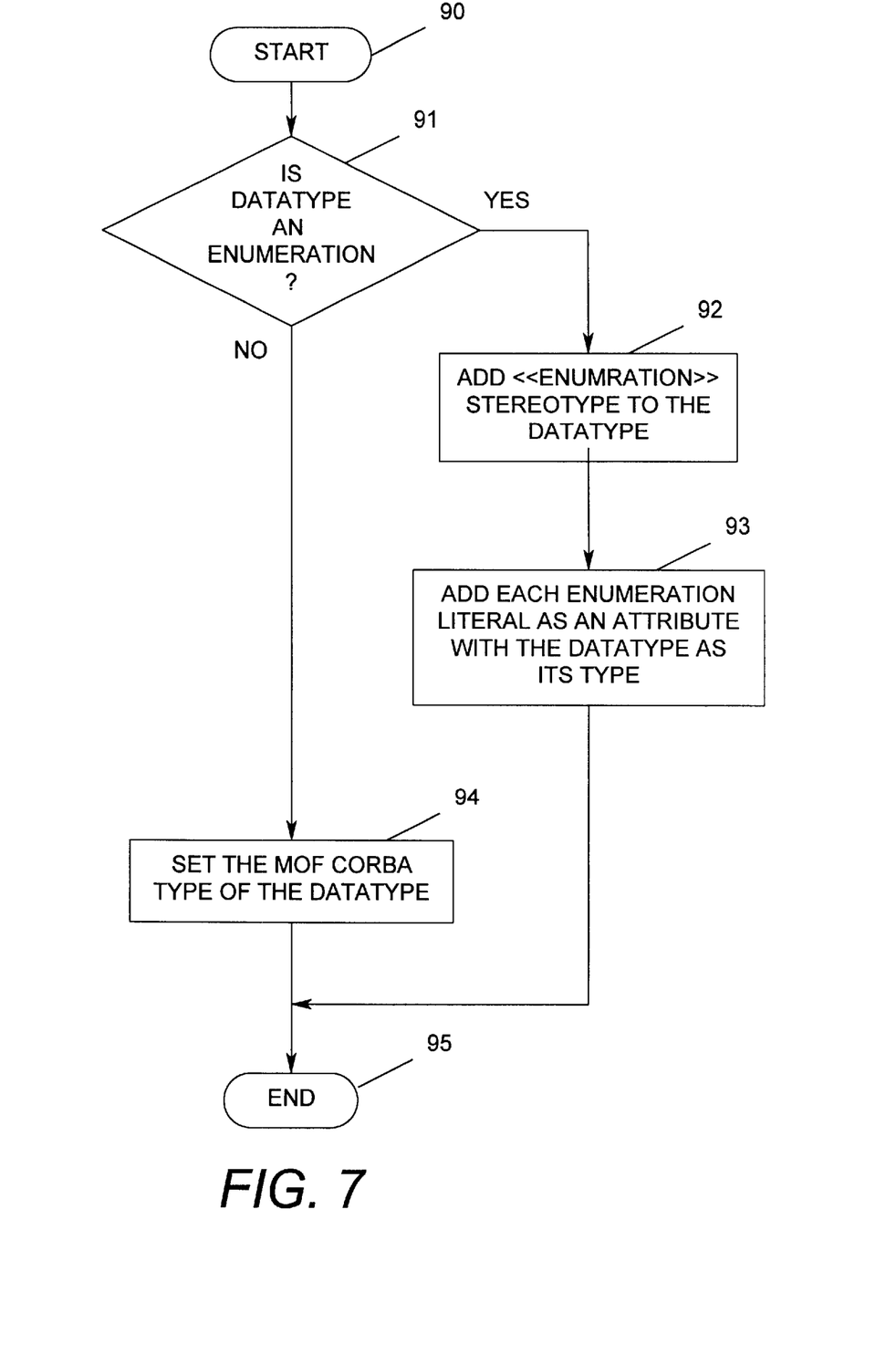
FIG. 7 is a flow chart of the process for converting a DataType.

Referring now to FIG. 3, a flow chart of the process for converting a Metamodel is shown. The process begins with a start bubble 30 followed by a step of removing Inheritance from RSM classes (block 31). Next, each explicit "Construct" Operation is removed (block 32); and each use of an RSM type (like UREPString) is changed to use a non-RSM type (like string) (block 33). After this, each Attribute is converted (block 34), which is shown in FIG. 4 and amplified hereinbelow. Each Operation is next converted (block 35), which is shown in FIG. 5 and amplified hereinbelow. Following the above, each AssociationEnd is converted (block 36), which is shown in FIG. 6 and amplified hereinbelow; and, each DataType is converted (block 37), which is shown in FIG. 7 and amplified hereinbelow.

An inquiry is next made as to whether or not the RSM Naming Service is used in the RSM-based metamodel (diamond 38). If the answer to this inquiry is yes, then the name Attributes that would have been inherited form the RSM's UREPNamedObject are added (block 39). On the other hand if the answer to the inquiry is no, or upon completion of the step depicted by the block 39, the <<Metamodel>> stereotype is added to the package (block 40). Finally, the MOF Properties on the Package (idl_prefix and xmi.namespace) are set (block 41) and the process ends (bubble 42).

Referring now to FIG. 4, the process for converting an Attribute is shown. The process begins with a start bubble 45 followed by an inquiry as to whether or not UREP Collection is Type=single-valued (diamond 46). If the answer to this inquiry is no, then another inquiry is made as to whether or not UREP Collection is Type=List or UniqueList (diamond 48). If the answer to this inquiry is yes, then MOF isordered is set to TRUE (block 49). On the other hand, if the answer to this inquiry is no (or upon completion of the step depicted by the block 49) yet another inquiry is made as to whether or not UREP Collection Type=set or UniqueList (diamond 50). If the answer to this inquiry is yes, then MOF isUnique is set to TRUE (block 51).

Returning now to the inquiry depicted by the diamond 46, if the answer to this inquiry is yes, then an inquiry is made as to whether or not UREP Required=TRUE (diamond 52). If the answer to this inquiry is no, then MOF Multiplicity is set to 0 . . . 1 (block 53). On the other hand, if the answer to the inquiry depicted by the diamond 52 is yes, or upon completion of the step depicted by the block 53, or if the answer to the inquiry depicted by the diamond 50 is no, or upon completion of the step depicted by the block 51, still another inquiry is made as to whether or not UREP Access= Read (diamond 54). If the answer to this inquiry is yes, then MOF ischangeable is set to FALSE (block 55). On the other hand, if the answer to the inquiry depicted by the diamond 54 is no, or upon completion of the step depicted by the block 55, the process ends (bubble 56).

Figure 5A:
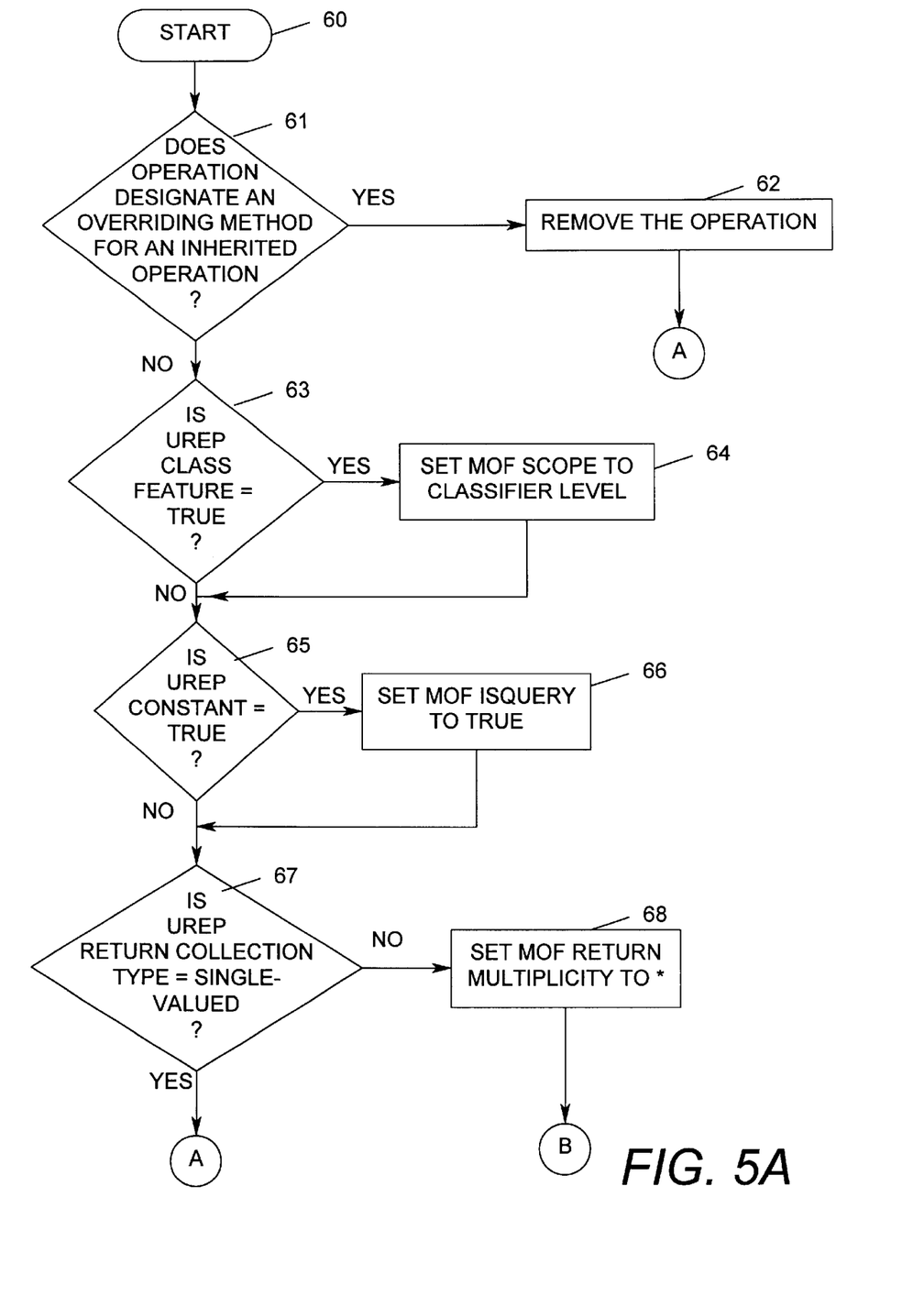
FIGS. 5A and 5B combined form a flow chart of the process for converting an Operation.

Referring now to FIG. 5A, the first of a two-sheet drawing of the process for converting an Operation is shown. The process begins with a start bubble 60 followed by an inquiry as to whether or not Operation designates an overriding method for an inherited Operation (diamond 61). If the answer to this inquiry is yes, then the Operation is removed (block 62) and the process illustration continues in FIG. 5B as depicted by a connector A. On the other hand, if the answer to this inquiry is no, then another inquiry is made as to whether or not UREP Class Feature=TRUE (diamond 63). If the answer to the diamond 63 inquiry is yes, then MOF Scope is set to Classifier Level (block 64).

If the answer to the inquiry depicted by the diamond 63 is no, or upon completion of the step depicted by the block 64, yet another inquiry is made as to whether or not UREP Constant=TRUE (diamond 65). If the answer to this inquiry is yes, then the MOF isQuery is set to TRUE (block 66). On the other hand, if the answer to this inquiry is no, or upon completion of the step depicted by the block 66, still another inquiry is made as to whether or not UREP return Collection Type=single-valued (diamond 67). If the answer to this inquiry is no, then MOF return Multiplicity is set to * (block 68). On the other hand, if the answer to the inquiry depicted by the diamond 67 is yes, then the process illustration continues in FIG. 5B as depicted by the connector A. Likewise, upon completion of the step depicted by the block 68, then the process illustration continues in FIG. 5B as depicted by the connector B.

Figure 5B:
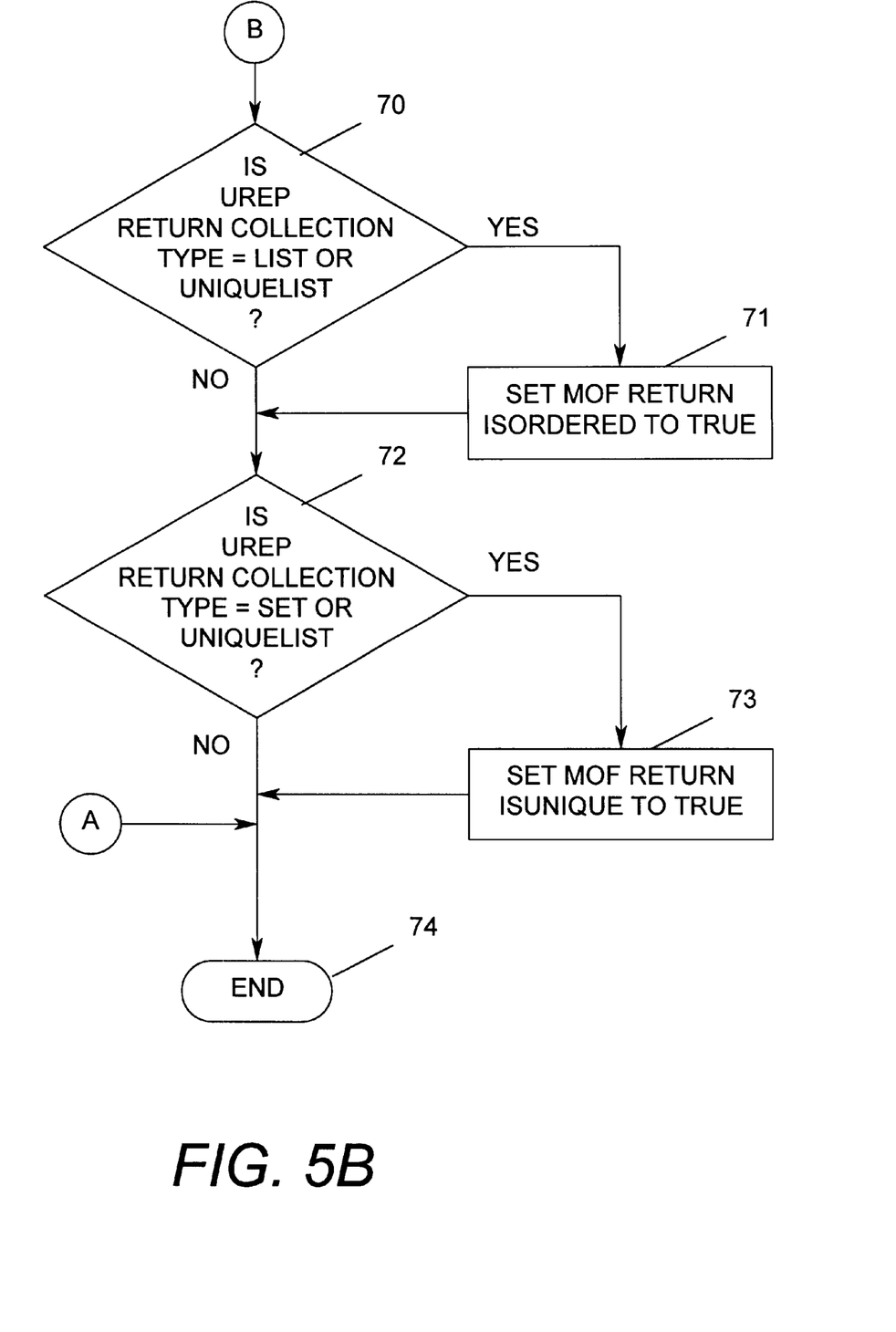

Referring now to FIG. 5B at the connector B, an inquiry is made as to whether or not UREP return Collection Type=List or UniqueList (diamond 70). If the answer to this inquiry is yes, then MOF return isOrdered is set to TRUE (block 71). If the answer to the inquiry is no, or upon completion of the step depicted by the block 71, another inquiry is made as to whether or not UREP return Collection Type=set or UniqueList (diamond 72). If the answer to this latter inquiry is yes, then MOF return isUnique is set to TRUE (block 73). If the answer to the inquiry depicted by the diamond 72 is no, or upon completion of the step depicted by the block 73, the process ends (bubble 74). Note also, that the connector A goes to the end bubble 74.

Referring now to FIG. 6, a flow chart of the process for converting an AssociationEnd is shown. The process begins with a start bubble 77 followed by an inquiry as to whether or not UREP Access=Read (diamond 78). If the answer to this inquiry is yes, then MOF ischangeable is set to FALSE (block 79). On the other hand, if the answer to the inquiry 78 is no, or upon completion of the step depicted by the block 79, another inquiry is made as to whether or not UREP Collection Type is List or UniqueList (diamond 80). If the answer to this inquiry is yes, "ordered" is specified as a constraint (diamond 81). On the other hand, if the answer to the inquiry 80 is no, or upon completion of the step depicted by the block 81, another inquiry is made as to whether or the End is Composite (diamond 82).

If the answer to the inquiry depicted by the diamond 82 is yes, then Multiplicity.Upper is set to one (block 83) and the process ends (bubble 87). On the other hand, if the answer to this inquiry is no, then yet another inquiry is made as to whether or not the opposite End has UREP Dependent= TRUE (diamond 84). If the answer to this inquiry is no, then the process ends (bubble 87). On the other hand, if the answer to this inquiry is yes, then still another inquiry is made as to whether or not Multiplicity.Upper is equal to one (diamond 85). If the answer to this inquiry is yes, then the End is made Composite (block 86). If the answer to the inquiry depicted by the diamond 85 is no, or upon completion of the step depicted by the block 86, the process ends (bubble 87).

Referring now to FIG. 7, the process for converting a DataType is shown. The process begins with a start bubble 90 followed by an inquiry as to whether or not DataType is an Enumeration (diamond 91). If the answer to this inquiry is yes, then the <<enumeration>> stereotype is added to the DataType (block 92) and each Enumeration literal is added as an Attribute with the DataType as its type (block 93) and the process ends (bubble 95). If the answer to the inquiry depicted by the diamond 91 is no, then the MOF CORBA Type of the DataType is set (block 94) and the process ends (bubble 95).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer-implemented method for converting a UML rendering of an RSM-based metamodel to a UML rendering of a MOF-based metamodel, said method comprising the steps of:
   a. removing inheritance from classes defined within a Repository Services Model ("RSM");
   b. removing each explicit "construct" operation from each class in said RSM-based metamodel;
   c. changing each use in said RSM-based metamodel of an RSM type to use a non-RSM type;
   d. converting each element of said RSM-based metamodel to a corresponding MOF-based element;
   e. determining whether or not RSM naming service is used in said RSM-based metamodel, and if so adding "name" attributes that would have been inherited from said RSM classes;
   f. adding <<metamodel>> stereotype to said UML rendering of said MOF-based metamodel; and,
   g. setting MOF properties on said UML rendering of a MOF-based metamodule.

2. The method as in claim 1 wherein said step of converting further includes converting each Attribute of each class within said RSM-based metamodel.

3. The method as in claim 2 further comprising for each of said Attributes:
   h. determining whether or not collection type is single-valued;
   i. if said collection type is single-valued and if said Attribute is not required, setting multiplicity of said Attribute to a range of 0 . . . 1;
   j. if said collection type is List or UniqueList, setting MOF isordered to TRUE;
   k. if said collection type is Set or UniqueList, setting MOF isUnique to TRUE; and,
   l. determining if access=read, and if so, setting MOF ischangeable to FALSE.

4. The method as in claim 1 wherein said step of converting further includes converting each Operation of each class within said RSM-based metamodel.

5. The method as in claim 4 further comprising for each of said Operations:
   h. determining if said operation designates an over-riding method for an inherited Operation, and if so;
   i. removing said Operation.

6. The method as in claim 5 for each of said operations which are not removed, further comprising:
   a. determining if Class Feature=TRUE, and if so setting MOF scope to Classifier level;
   h. determining if Constant=TRUE, and if so setting MOF isQuery to TRUE;
   i. determining if Return Collection type=single-value, and if not setting Return multiplicity to a range of 0 . . . * ("zero to infinity");
   j. where said return collection type=List or UniqueList, setting MOF return.isordered to TRUE; and,
   k. where said return collection type=Set or UniqueList, setting MOF return.isUnique to TRUE.

7. The method as in claim 1 wherein said step of converting further includes converting each end of each Association within said RSM-based metamodel.

8. The method as in claim 7 further comprising for each of said ends the steps of:
   h. determining if Access=read, and if so setting MOF ischangeable to FALSE;
   i. determining if Collection type=List or UniqueList, and if so specifying "ordered" as a constraint on said end;
   j. determining if said end is composite, and if so setting the upper limit of multiplicity range to 1; and,
   k. where said end is not composite, determining if the opposite end has Dependent=TRUE, and if so and the upper bound of the multiplicity range of said end is 1, making said end composite.

9. The method as in claim 1 wherein said step of converting further includes converting each data type within said RSM-based metamodel.

10. The method as in claim 9 further comprising for each data type the steps of:
    h. determining if said data type is an enumeration, and if so adding <<enumeration>> stereotype to said data type, and adding each enumeration literal as an Attribute of said data type; and,
    i. and not an enumeration, setting the MOF CORBA type of said Data Type.

11. A storage medium encoded with machine-readable computer program code for converting a UML rendering of an RSM-based metamodel to a UML rendering of a MOF-based metamodel, wherein, when the computer program code is executed by a computer, the computer performs the steps of:
    a. removing inheritance from classes defined within a Repository Services Model ("RSM");
    b. removing each explicit "construct" operation from each class in said RSM-based metamodel;
    c. changing each use in said RSM-based metamodel of an RSM type to use a non-RSM type;

d. converting each element of said RSM-based metamodel to a corresponding MOF-based element;

e. determining whether or not RSM naming service is used in said RSM-based metamodel, and if so adding "name" attributes that would have been inherited from said RSM classes;

f. adding <<metamodel>> stereotype to said UML rendering of said MOF-based metamodel; and, g. setting MOF properties on said UML rendering of a MOF-based metamodule.

12. The medium as in claim 11 wherein said step of converting further includes converting each Attribute of each class within said RSM-based metamodel.

13. The medium as in claim 12 further comprising for each of said Attributes:

h. determining whether or not collection type is single-valued;

i. if said collection type is single-valued and if said Attribute is not required, setting multiplicity of said Attribute to a range of 0 . . . 1;

j. if said collection type is List or UniqueList, setting MOF isordered to TRUE;

k. if said collection type is Set or UniqueList, setting MOF isUnique to TRUE; and, l. determining if access=read, and if so, setting MOF ischangeable to FALSE.

14. The medium as in claim 11 wherein said step of converting further includes converting each Operation of each class within said RSM-based metamodel.

15. The medium as in claim 14 further comprising for each of said Operations:

h. determining if said Operation designates an over-riding method for an inherited Operation, and if so;

i. removing said Operation.

16. The medium as in claim 15 for each of said Operations which are not removed, further comprising:

a. determining if Class Feature=TRUE, and if so setting MOF scope to Classifier level;

h. determining if Constant=TRUE, and if so setting MOF isQuery to TRUE;

i. determining if Return Collection type=single-value, and if not setting Return multiplicity to a range of 0 . . . * ("zero to infinity");

j. where said return collection type=List or UniqueList, setting MOF return.isordered to TRUE; and, k. where said return collection type=Set or UniqueList, setting MOF return.isUnique to TRUE.

17. The medium as in claim 11 wherein said step of converting further includes converting each end of each Association within said RSM-based metamodel.

18. The medium as in claim 11 further comprising for each of said ends the steps of:

h. determining if Access=read, and if so setting MOF ischangeable to FALSE;

i. determining if Collection type=List or UniqueList, and if so specifying "ordered" as a constraint on said end;

j. determining if said end is composite, and if so setting the upper limit of multiplicity range to 1; and, k. where said end is not composite, determining if the opposite end has Dependent=TRUE, and if so and the upper bound of the multiplicity range of said end is 1, making said end composite.

19. The medium as in claim 11 wherein said step of converting further includes converting each data type within said RSM-based metamodel.

20. The medium as in claim 19 further comprising for each data type the steps of:

h. determining if said data type is an enumeration, and if so adding <<enumeration>> stereotype to said data type, and adding each enumeration literal as an Attribute of said data type; and, i. and not an enumeration, setting the MOF CORBA type of said Data Type.

* * * * *